(12) United States Patent
Cannaday, Jr. et al.

(10) Patent No.: US 6,614,382 B1
(45) Date of Patent: Sep. 2, 2003

(54) BEAM ELEVATION DISPLAY METHOD AND SYSTEM

(75) Inventors: Theodore H. Cannaday, Jr., Staley, NC (US); Edward C. Pershouse, Acton, MA (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 10/115,871

(22) Filed: Apr. 3, 2002

Related U.S. Application Data

(60) Provisional application No. 60/281,089, filed on Apr. 3, 2001.

(51) Int. Cl.$^7$ ................................. G01S 13/95
(52) U.S. Cl. ........................ 342/26; 342/74; 342/81; 342/120; 342/146; 342/179; 342/180; 342/181
(58) Field of Search .................. 342/26, 74, 75, 342/81, 85, 118, 120, 121, 123, 146, 157, 158, 176, 179, 180, 181, 182, 195, 197

(56) References Cited

U.S. PATENT DOCUMENTS

| | | | | |
|---|---|---|---|---|
| 3,833,904 A | | 9/1974 | Gebhardt et al. ............... 343/5 |
| 5,175,551 A | * | 12/1992 | Rubin ........................... 342/26 |
| 5,262,782 A | * | 11/1993 | Rubin et al. ................... 342/26 |
| 5,392,048 A | * | 2/1995 | Michie .......................... 342/26 |
| 5,440,483 A | * | 8/1995 | Badoche-Jacquet et al. ... 702/3 |
| 5,828,332 A | | 10/1998 | Frederick ...................... 342/26 |
| 5,920,276 A | * | 7/1999 | Frederick ...................... 342/26 |
| 6,480,142 B1 | * | 11/2002 | Rubin ........................... 342/26 |
| 2003/0001770 A1 | * | 1/2003 | Cornell et al. ................. 342/26 |
| 2003/0016156 A1 | * | 1/2003 | Szeto et al. .................... 342/26 |
| 2003/0161155 | * | 1/2003 | Szeto et al. .................... 342/26 |

* cited by examiner

Primary Examiner—John B. Sotomayor
(74) Attorney, Agent, or Firm—Hamilton, Brook, Smith & Reynolds, P.C.

(57) ABSTRACT

The relative altitude of the center of a radar beam in relation to the aircraft's altitude at a plurality of distance ranges from the radar source is computed. A plurality of range rings representing the distance ranges are displayed. The computed relative altitude is displayed adjacent to each range ring displayed.

22 Claims, 5 Drawing Sheets

BEAM ELEVATION DISPLAY METHOD AND SYSTEM

RELATED APPLICATION

This application claims the benefit of U.S. Provisional Application No. 60/281,089, filed on Apr. 3, 2001. The entire teachings of the above application are incorporated herein by reference.

BACKGROUND OF THE INVENTION

A weather radar system measures and maps rainfall intensity within a scanned area. Intense rainfall may include severe turbulence which can be hazardous to aircraft flight. The weather radar system includes an antenna receiver/transmitter unit. The unit emits a concentrated beam of microwave energy. The intensity of the rainfall at a given location is indicated by the color displayed. The rainfall data returned from the unit is displayed as color coded echos on a display.

The pilot relies on the radar tilt control to vertically examine the weather ahead of the aircraft. The pilot can typically tilt the radar beam plus or minus fifteen degrees. In an unstabilized radar, the tilt of the aircraft must be taken into account when computing the radar tilt. In a stabilized radar, the radar tilt is measured from a radar platform that is always parallel with the earth's surface. The pilot modifies the tilt to determine the height of a storm. The computation is performed manually for each target knowing the tilt angle, the distance from the radar source and tilt of the aircraft. The algorithm for computing the relative altitude for the installed airborne radar system is typically published in the operator's manual of the radar system.

The manual computation is subject to pilot error, resulting in the pilot flying the aircraft into unknown hazardous weather conditions.

SUMMARY OF THE INVENTION

A weather radar display system includes an altitude routine and a display. The altitude routine computes the altitude of a radar beam relative to altitude of an aircraft at a plurality of distance ranges away from the aircraft. The display, responsive to the altitude routine, shows weather features found by the radar beam and displays a textual indication of the computed relative altitude at each of the distance ranges. The displayed textual indication provides an estimated altitude for the displayed weather feature.

Each distance range is displayed as a range ring. Each of the textual indications is displayed at the corresponding range ring. The textual indication may be the relative altitude in thousands of feet. The textual indication indicates whether the relative altitude is positive or negative.

The display of the textual indication may be selectable by a user. The display may include a menu item for selecting the display of the textual indication.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
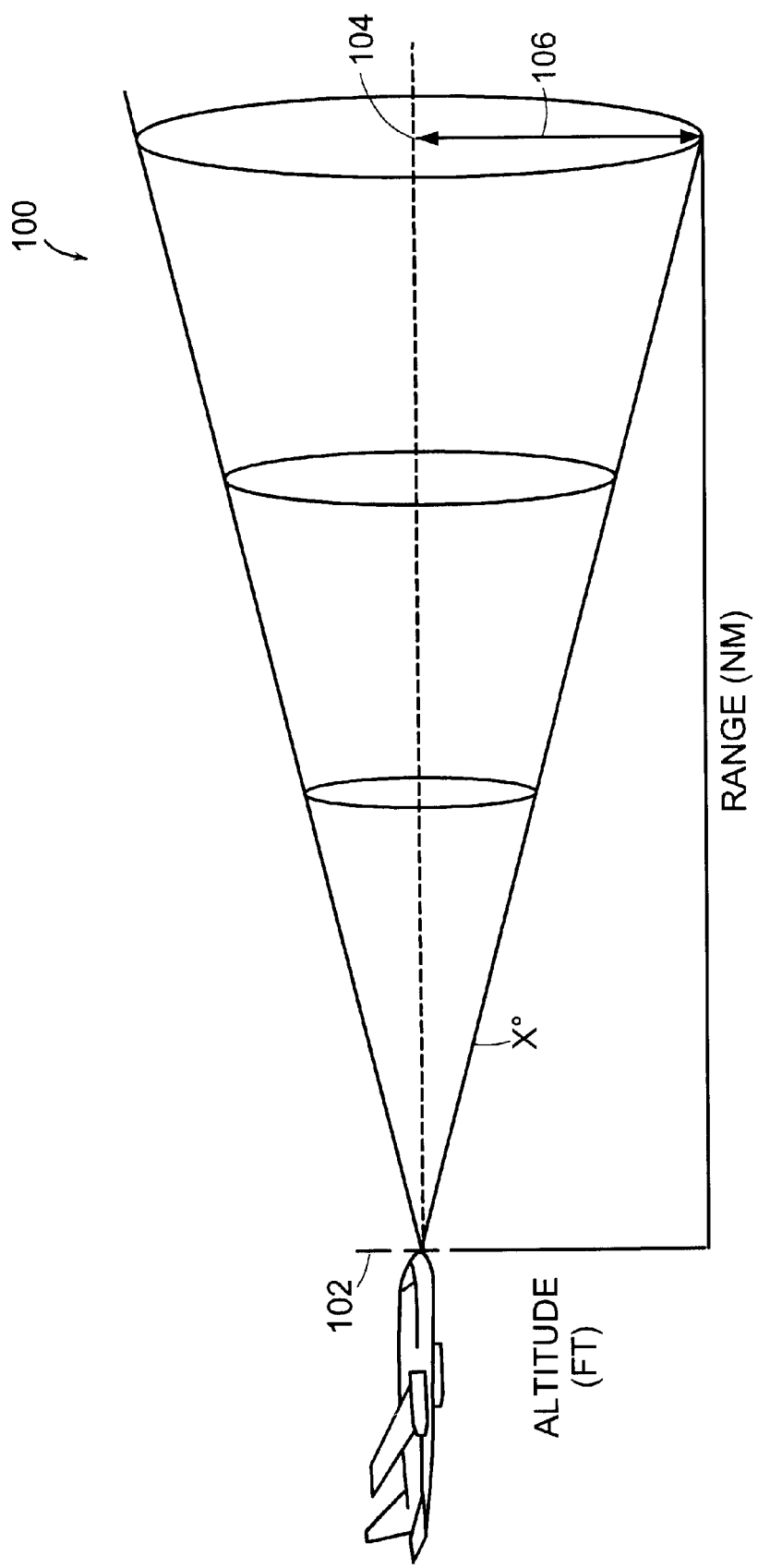
FIG. 1 is graphical representation of a radar beam emitted from an airborne weather radar system at a 0° tilt angle.

FIG. 1 is a graphical representation of a radar beam 100 emitted from an airborne weather radar system 102 at a 0° tilt angle. The center of the radar beam 104 is always at the same above-ground altitude 106 as the aircraft.

Figure 2:
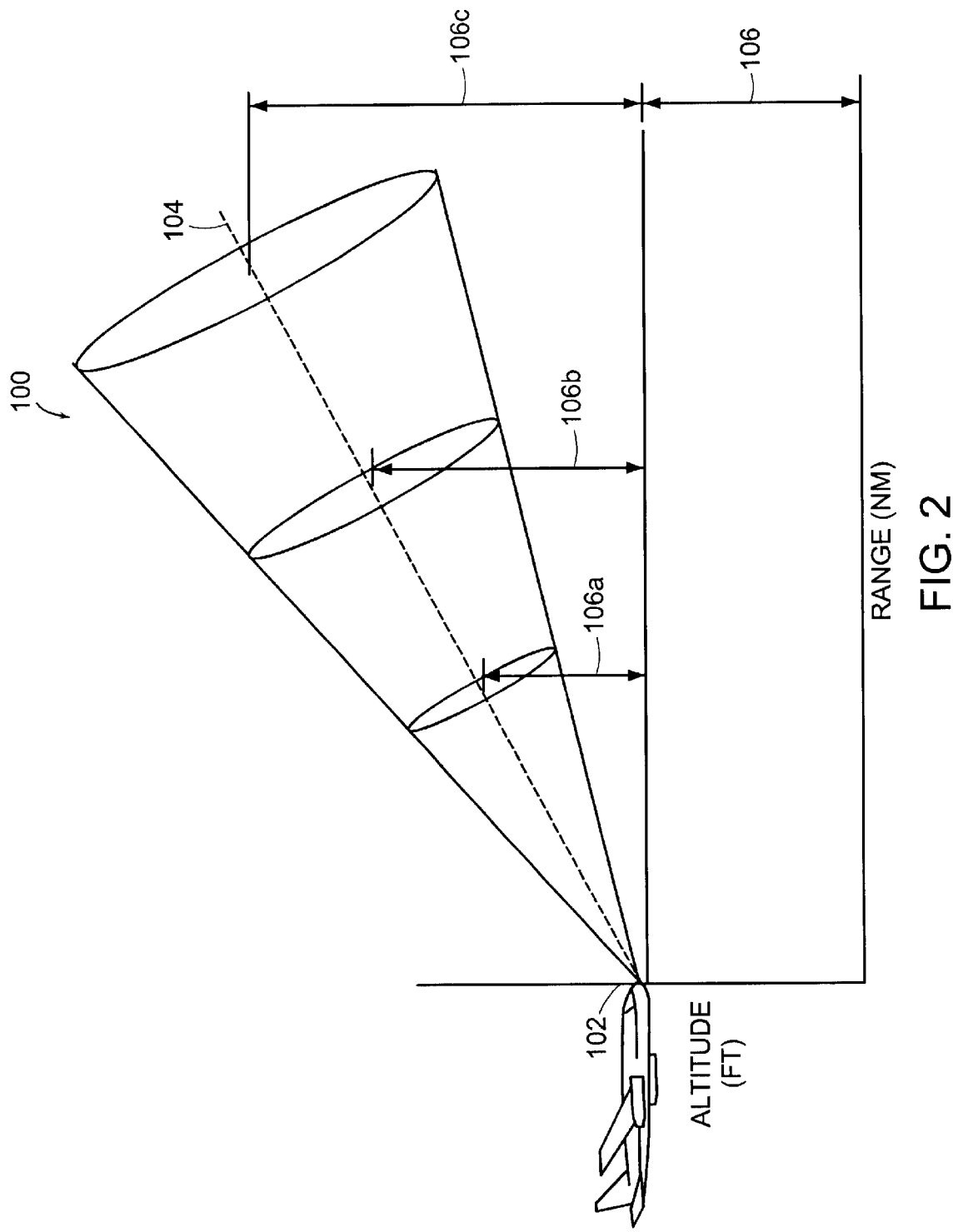
FIG. 2 is a graphical representation of the radar beam emitted from the airborne weather radar system with the radar antenna tilted up.

FIG. 2 is a graphical representation of the radar beam emitted from the airborne weather radar system with the radar antenna tilted up. The pilot can examine weather above the aircraft by tilting the radar antenna up. In a typical airborne radar system, the maximum tilt angle to which the antenna can be tilted up is +15 degrees. As shown, the relative altitude 106a, b, c of the radar beam 100 with respect to the altitude 106 of the aircraft increases with distance from the radar source (aircraft) 102. The relative altitude 106a, b, c at a particular distance can be computed knowing the tilt angle.

Figure 3:
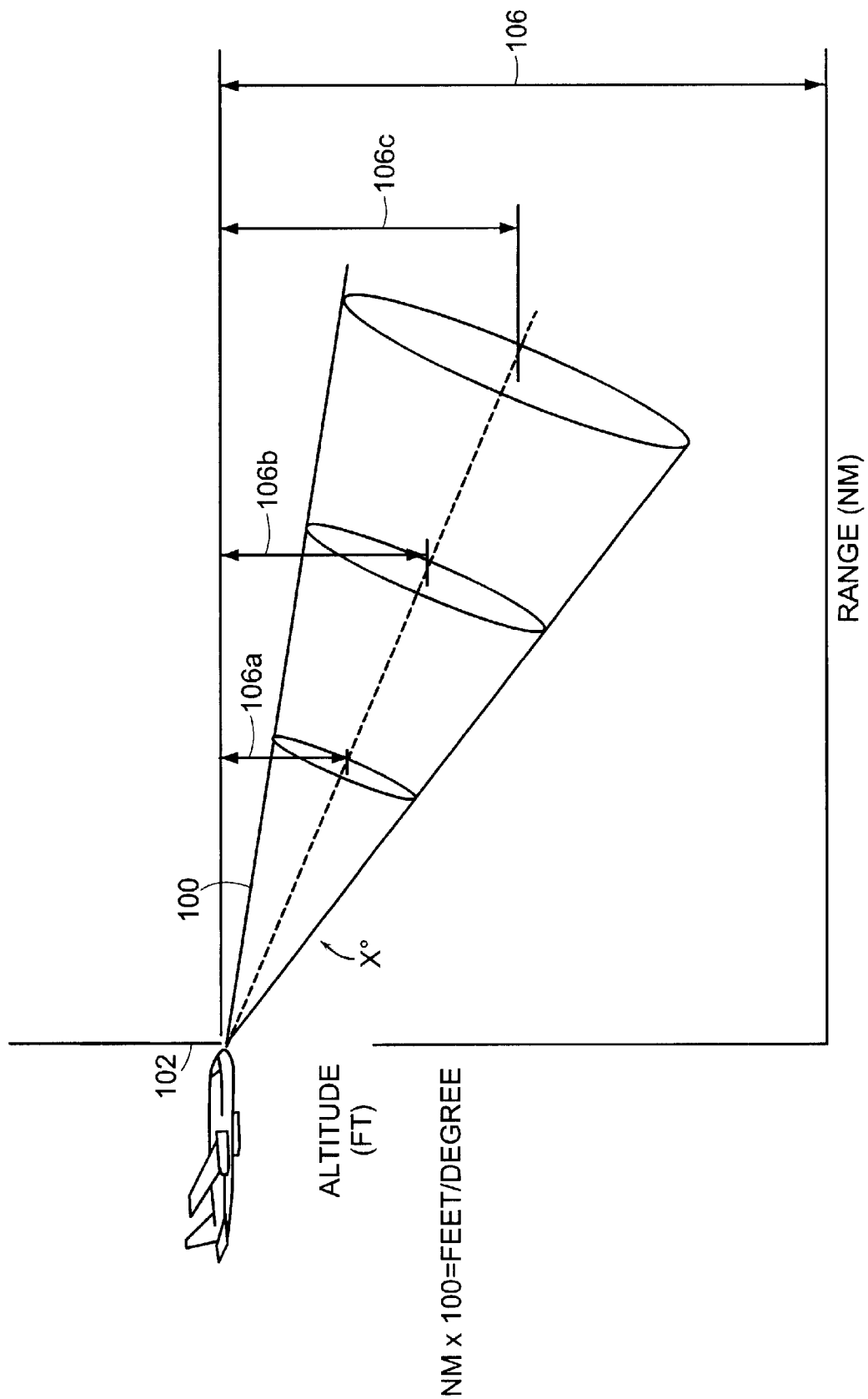
FIG. 3 is a graphical representation of the radar beam emitted from the airborne weather radar system with the radar antenna tilted down.

FIG. 3 is a graphical representation of the radar beam 100 emitted from the airborne weather radar system 102 with the radar antenna tilted down. The pilot can examine weather below the aircraft by tilting the radar antenna down. In a typical airborne radar system, the maximum angle to which the antenna can be titled down is −15 degrees. As shown, the relative altitude 106a, b, c of the radar beam 100 with respect to the altitude 106 of the aircraft decreases with distance from the radar source 102. The relative altitude 106a, b, c at a particular distance from the radar source can be computed knowing the tilt angle.

Figure 4:
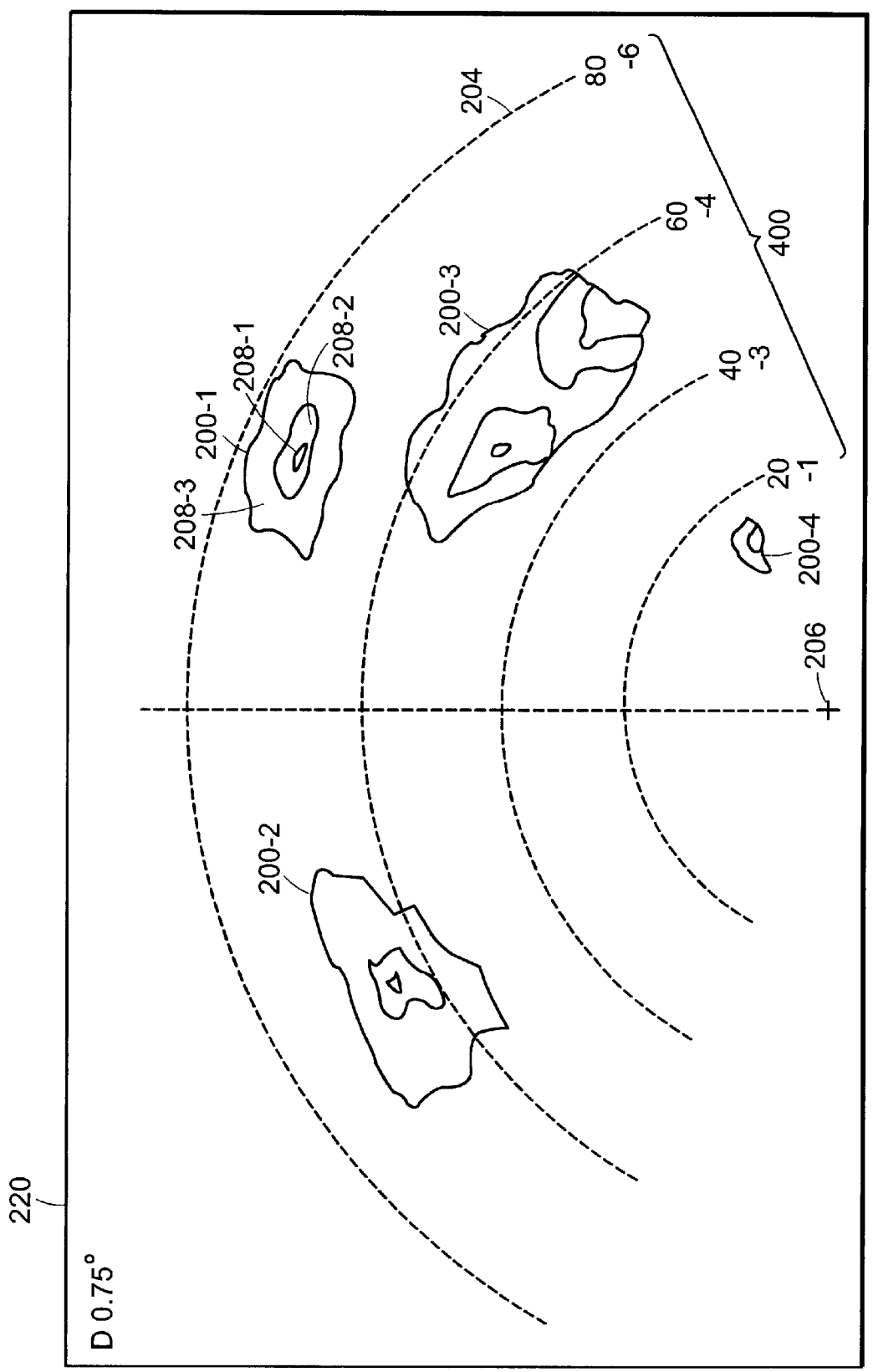
FIG. 4 is graphical depiction of targets detected by an airborne weather radar displaying a textual indication of the relative altitude of the center of the radar beam in relation to the aircraft's altitude according to the principles of the present invention.

FIG. 4 is a graphical depiction of targets detected by an airborne weather radar displaying a textual indication 400 of the relative altitude of the center of the radar beam in relation to the aircraft's altitude according to the principles of the present invention.

In the image displayed, the radar antenna has been tilted down by 0.75 degrees to detect targets below the current altitude of the aircraft. The tilt direction and angle is indicated by displaying D 0.75 in the left corner of the display 220. A plurality of range rings 204 displayed on the display 220 indicate distance from the airborne weather radar mounted on the aircraft 206. In the embodiment shown, four range rings 204 are shown at range values 20 nautical miles (nm), 40 nm, 60 nm and 80 nm from the airborne weather radar. A textual indication 400 of the relative altitude of the center of the radar beam at the distance range relative to the altitude of the aircraft is displayed next to each range value. In the textual indication 400, each value represents thousands of feet. As shown, the relative altitude at the 20 nm range ring is −1000 feet, the relative altitude at the 40 nm range ring is −3000 feet, the relative altitude at the 60 nm range ring is −4000 feet, and the relative altitude at the 80 nm range ring is −6000 feet. Thus, target 200-3 is 60 nm from the radar source 206 and 4,000 feet below the aircraft's current altitude.

The invention is not limited to four distance ranges shown in the illustration of FIG. 4. The number of range values displayed is dependent on the number available from the installed airborne weather radar system and the number selected to be displayed.

The displayed textual indication of the relative altitude can be positive or negative based on the tilt of the radar antenna. For example, if the radar antenna is tilted up by 2 degrees "U 2" is displayed in the left hand corner of the display 220 and the relative altitude is positive. The display of the textual indication 400 of the relative altitude can be disabled through a user interface.

The displayed textual indication 400 of beam altitude can assist the pilot in determining the altitude of weather features such as the tops of thunderstorms, allowing more informed decision-making about flight paths and altitudes for a particular flight. Pilot error in manual computation is eliminated by computing the relative altitude for a plurality of ranges 204 and displaying a textual indication 400 of the computed relative altitude on the display 220. The displayed textual indication 400 of a computed relative altitude eliminates the need for cumbersome radar tilt calculators.

Where the terrain is even, the invention can also be used to verify the altitude of the aircraft. The radar antenna is tilted down and the distance to where the beam hits the ground is computed. This distance is used to verify the altitude of the aircraft.

The invention can be used with a non-stabilized radar system. However, in such a case, the textual indication 400 of the relative altitude displayed is only correct when the aircraft is in straight and level flight.

Figure 5:
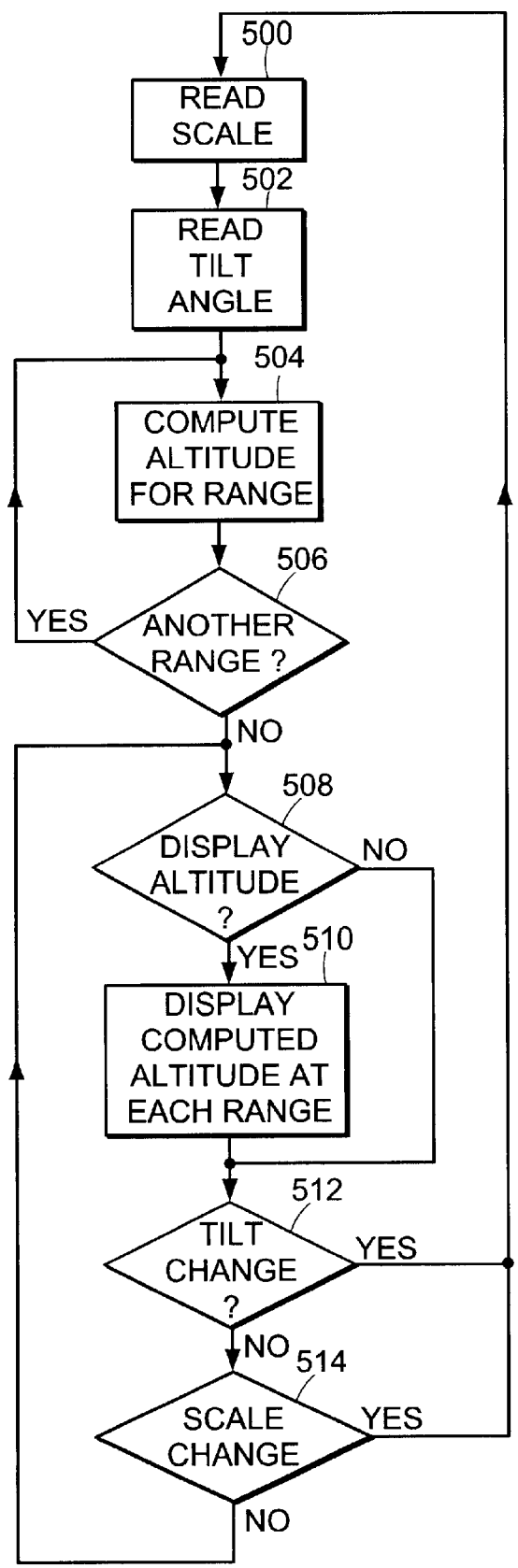
FIG. 5 is a flowchart illustrating the steps implemented in an altitude routine for computing the relative altitude of the center of the radar beam in relation to the aircraft's altitude and displaying a textual indication of the computed relative altitude on the display.

FIG. 5 is a flowchart illustrating the steps implemented in an altitude routine executed in the weather radar system for computing the relative altitude of the center of the radar beam in relation to the aircraft's altitude and displaying a textual indication 400 of the computed relative altitude on the display 220.

At step 500, the altitude routine reads the stored scale selected by the user of the display 220. The selected scale determines the distance range and the range intervals (rings 204) displayed. Processing continues with step 502.

At step 502, the altitude routine reads the stored tilt angle (of the radar antenna) selected by the user of the airborne radar system 206. Processing continues with step 504.

At step 504, the altitude routine computes the relative altitude at one of the range intervals (rings 204). The relative altitude is computed using the following algorithm:

$$\text{Relative Altitude at range ring } 204 = \text{Range} * 6076 * \sin(\text{Tilt}) * \text{Fraction of System Range for Ring}$$

Where: Relative Altitude at range Ring is expressed in feet;
Range is the range (distance) setting of interest and is expressed in nautical miles;
6076 is a constant representing feet per nautical mile;
Tilt is expressed in radians (obtained in step 502); and
Fraction of system range for Ring is expressed as Range÷system range setting (obtained in step 500).

For example, with a radar antenna tilt of 0.75°, the −4000 feet relative altitude at range ring 60 nm on an 80 nm system range setting is computed as follows:

$$60 * 6076 * \sin(\text{radian}(0.75°)) * (60/80) = -4000$$

Processing continues with step 506.

At step 506, the altitude routine determines if another computation is required for another range level dependent on the selected scale. If so, processing continues with step 504. If not, processing continues with step 508.

At step 508, the altitude routine checks if the user of the display 220 has selected display of relative altitude. If so, processing continues with step 510. If not, processing continues with step 512.

At step 510, the altitude routine forwards the computed relative altitudes (from step 504) to be displayed on the display 220 at the respective range intervals.

Also, at step 510, the computed relative altitude is truncated by removing the least significant 3 digits, and the results are formatted for display as a textual indicator 400. For example, the −4000 feet relative altitude at 60 nm is truncated by removing the three least significant 0's. The corresponding resulting textual indicator '−4' is displayed on display 220 and represents −4000 feet. Processing continues with step 512.

At step 512, the altitude routine checks the selected tilt angle to determine if it has changed and new relative altitudes and corresponding textual indicators 400 are to be computed. If the tilt has changed, processing continues with step 500 to compute new values (indicators 400). If not, processing continues with step 514.

At step 514, the altitude routine checks the selected scale to be displayed to determine if it has changed. If the scale has changed, processing continues with step 500 to compute new relative altitudes (textual indicators 400) to be displayed. If the scale has not changed, processing continues with step 508 to continue to display the computed values from step 504.

While this invention has been particularly shown and described with references to preferred embodiments thereof, it will be understood by those skilled in the art that various changes in form and details may be made therein without departing from the scope of the invention encompassed by the appended claims.

What is claimed is:

1. A weather radar display system comprising:
   an altitude routine which computes the altitude of a radar beam relative to altitude of an aircraft at a plurality of distance ranges away from the aircraft; and
   a display, responsive to the altitude routine, which shows weather features found by the radar beam and displays a textual indication of the computed relative altitude at each of the distance ranges, the displayed textual indication providing an estimated altitude for the displayed weather feature.

2. The weather radar display system as claimed in claim 1 wherein each distance range is displayed as a range ring.

3. The weather radar display system as claimed in claim 2 wherein each of the textual indications is displayed at the corresponding range ring.

4. The weather radar display system as claimed in claim 1 wherein the textual indication is the relative altitude in thousands of feet.

5. The weather radar display system as claimed in claim 1 wherein the textual indication indicates whether the relative altitude is positive or negative.

6. The weather radar display system as claimed in claim 1 wherein the display of the textual indication is selectable by a user.

7. The weather radar display system as claimed in claim 6 wherein the display includes a menu item for selecting the display of the textual indication.

8. A radar display system comprising:
- an altitude routine which computes the altitude of a radar beam relative to altitude of an aircraft at a plurality of distance ranges away from the aircraft; and
- a display, responsive to the altitude routine, which shows targets found by the radar beam and displays a textual indication of the computed relative altitude at each of the distance ranges, the displayed textual indication providing an estimated altitude for the displayed target.

9. A weather radar display system comprising:
- altitude means which computes the altitude of a radar beam relative to altitude of an aircraft at a plurality of distance ranges away from the aircraft; and
- a display, responsive to the altitude means, which shows weather features found by the radar beam and displays a textual indication of the computed relative altitude at each of the distance ranges, the displayed textual indication providing an estimated altitude for the displayed weather feature.

10. The weather radar display system as claimed in claim 9 wherein each distance range is displayed as a range ring.

11. The weather radar display system as claimed in claim 10 wherein each of the textual indications is displayed at the corresponding range ring.

12. The weather radar display system as claimed in claim 9 wherein the textual indication is the relative altitude in thousands of feet.

13. The weather radar display system as claimed in claim 9 wherein the textual indication indicates whether the relative altitude is positive or negative.

14. The weather radar display system as claimed in claim 9 wherein the display of the textual indication is selectable by a user.

15. The weather radar display system as claimed in claim 14 wherein the display includes a menu item for selecting the display of the textual indication.

16. A method for displaying echos returned by an airborne radar system comprising the steps of:
- computing the altitude of a radar beam relative to altitude of an aircraft at a plurality of distance ranges away from the aircraft; and
- displaying weather features found by the radar beam and a textual indication of the computed relative altitude at each of the distance ranges, the displayed textual indication providing an estimated altitude for the displayed weather feature.

17. The method as claimed in claim 1 wherein each distance range is displayed as a range ring.

18. The method as claimed in claim 2 wherein each of the textual indications is displayed at the corresponding range ring.

19. The method as claimed in claim 1 wherein the textual indication is the relative altitude in thousands of feet.

20. The method as claimed in claim 1 wherein the textual indication indicates whether the relative altitude is positive or negative.

21. The method as claimed in claim 1 wherein the display of the textual indication is selectable by a user.

22. The method as claimed in claim 6 further comprising the step of:
- displaying a menu item for selecting the display of the textual indication.

* * * * *